United States Patent Office 3,476,373
Patented Nov. 4, 1969

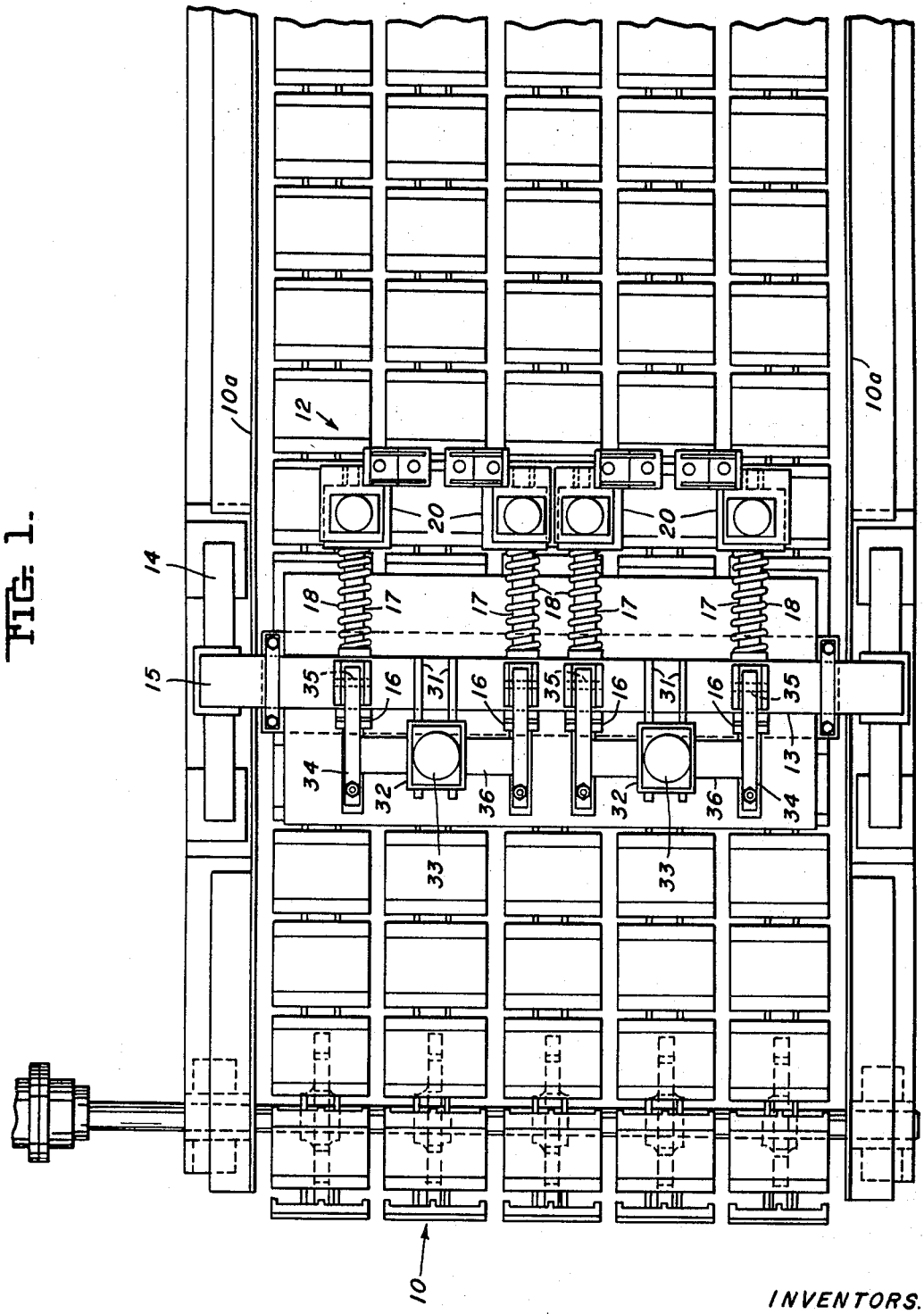

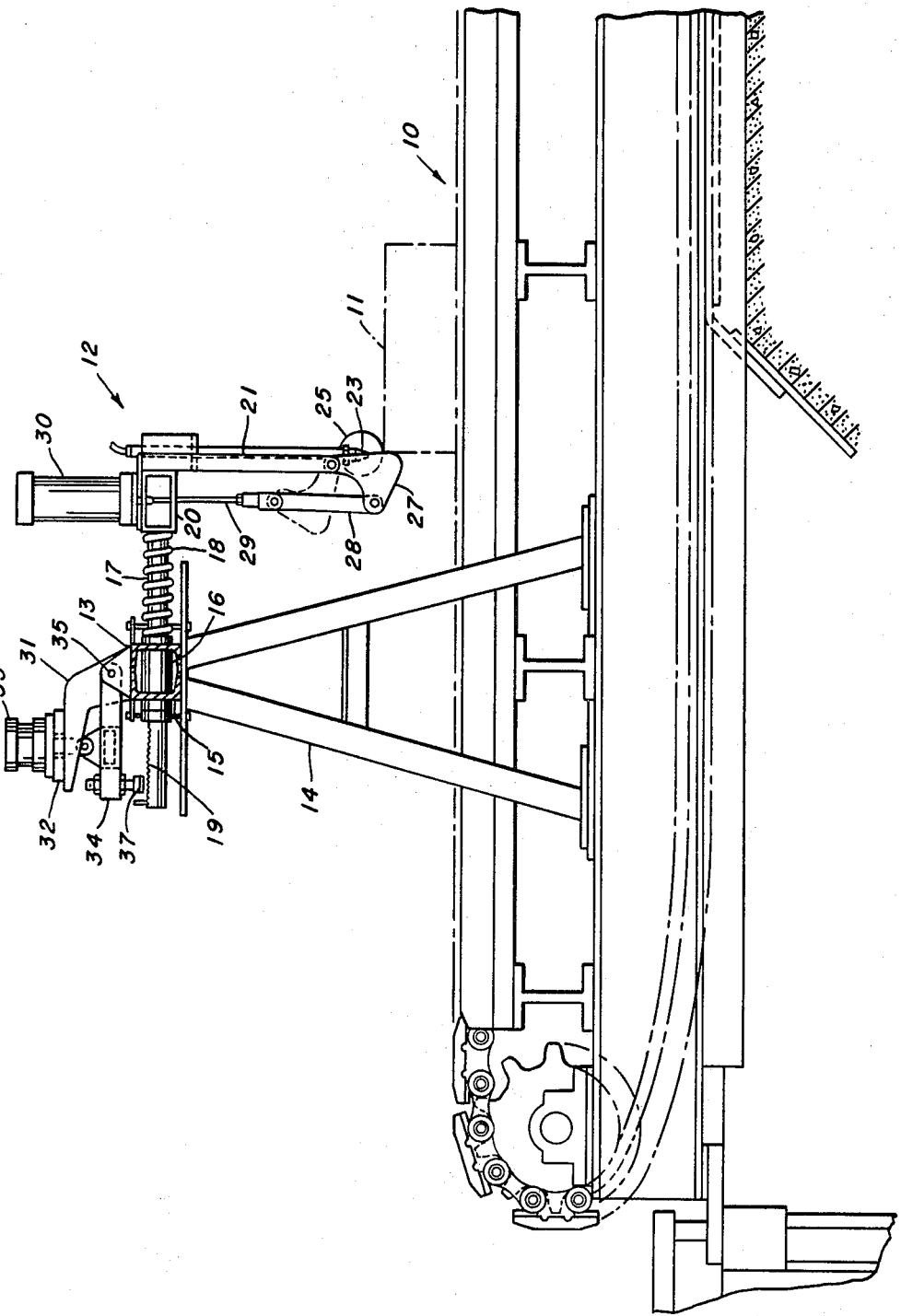

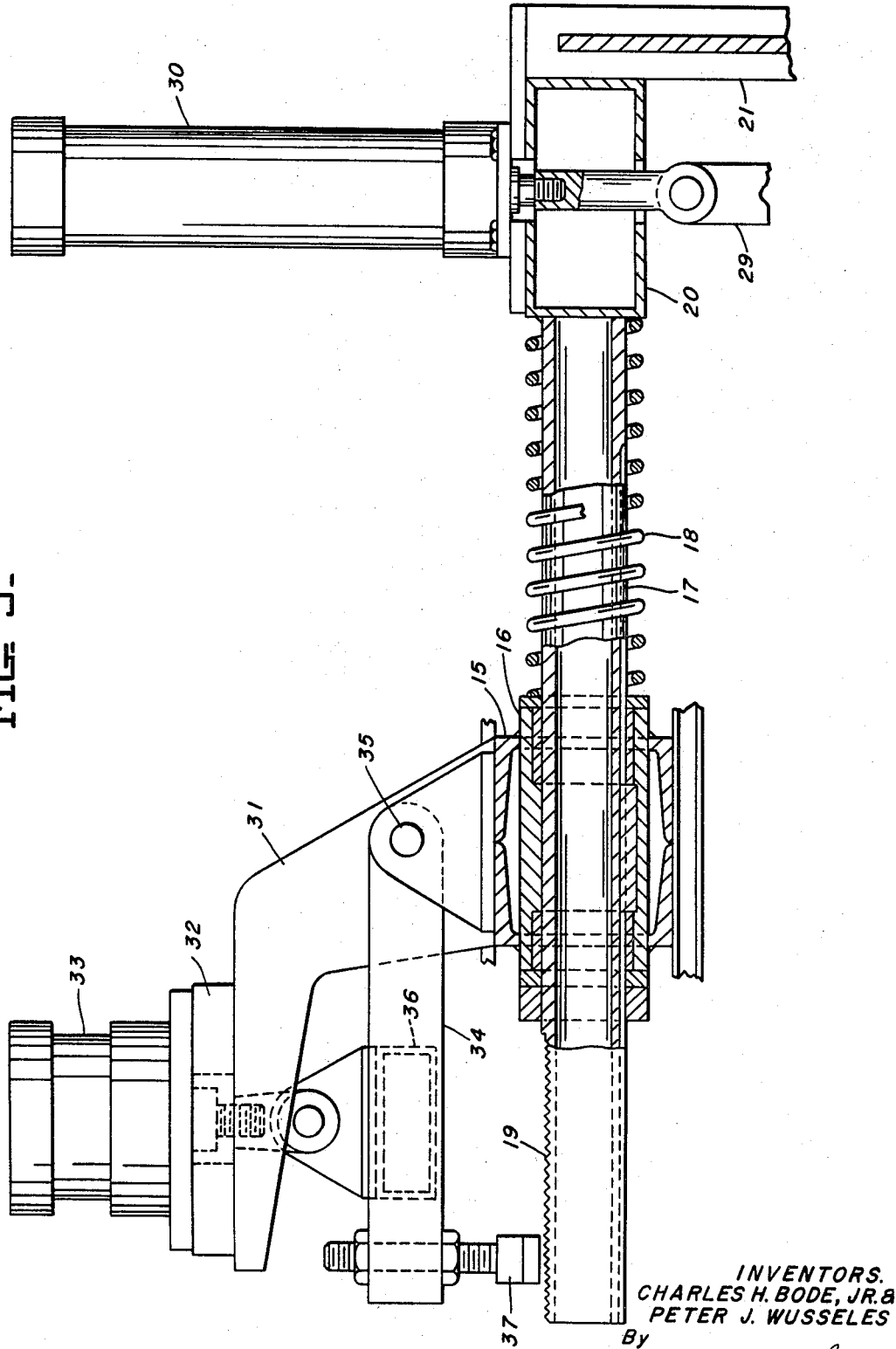

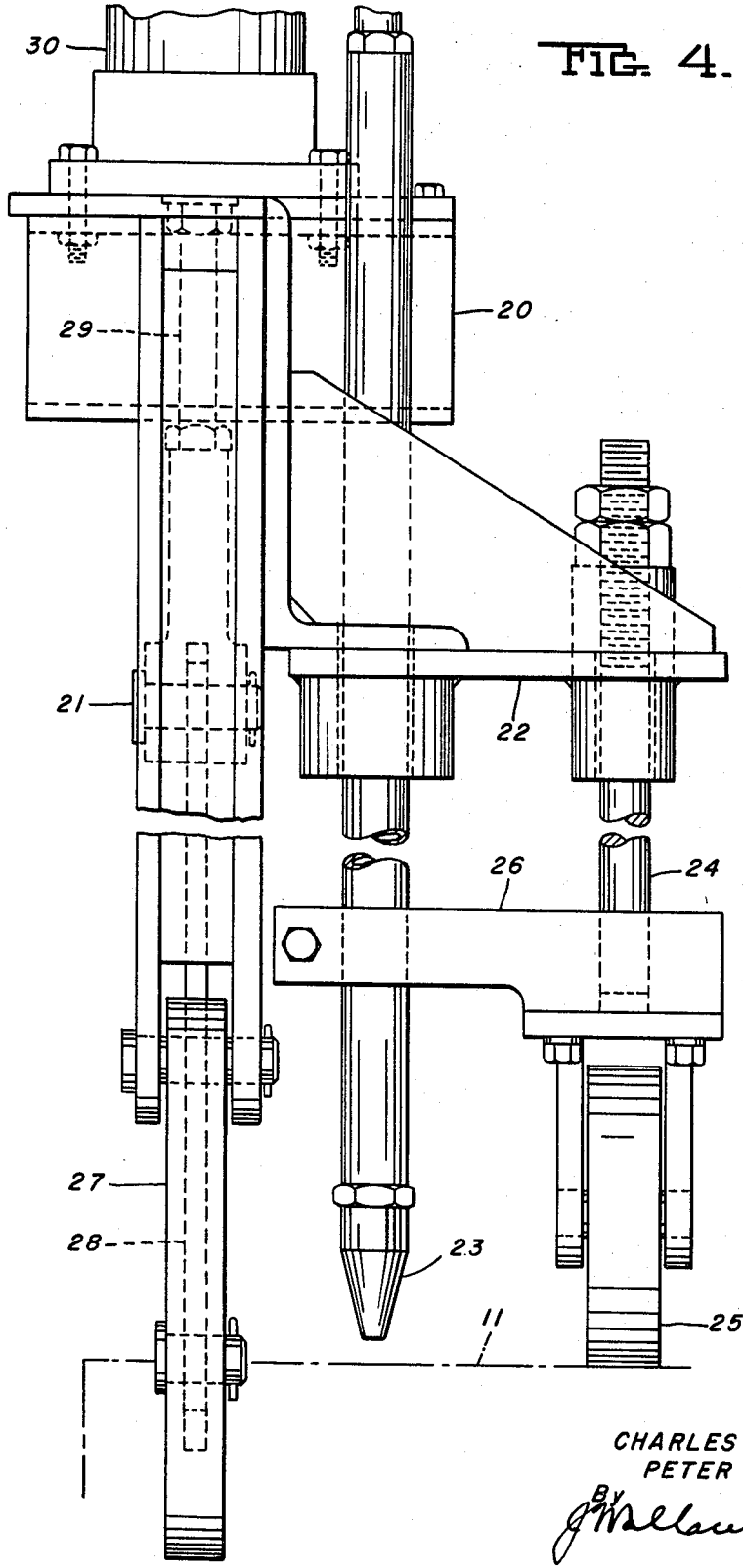

3,476,373
TORCH-MOUNTING APPARATUS FOR CUTTING PIECES OF IRREGULAR SHAPE
Charles H. Bode, Jr., Upper St. Clair Township, Allegheny County, and Peter J. Wusseles, Bridgeville Borough, Pa., assignors to United States Steel Corporation, a corporation of Delaware
Filed Dec. 22, 1967, Ser. No. 692,737
Int. Cl. B23k 7/10
U.S. Cl. 266—23                                   10 Claims

ABSTRACT OF THE DISCLOSURE

Apparatus for positioning torches properly to preheat and cut slab crops having irregular edges comprises a gantry extending across a crop conveyor. The gantry mounts a plurality of cutting torches each carried on a horizontal supporting tube slidable in the gantry and spring-urged to forwardmost position. For each torch a flag is pivoted to a strut depending from the tube. A linkage prevents pivoting of the flag when engaged by the crop to be cut. The tube is pushed back to an extent depending on the shape of the leading edge of the crop to be cut. When the last tube has been thus retracted and the crop brought to rest, clamps are applied to all tubes to hold them in position. A preheating flame from the torches is initiated and then a cutting flame. A cylinder and piston mounted on each tube lifts the flags out of the way before cutting starts.

BACKGROUND OF THE INVENTION

This invention relates to apparatus for cutting slab crops into sizes for recharging into a metal-refining vessel and, in particular, to apparatus for properly positioning each of a plurality of torches relative to the leading edge of the crop advancing to be cut, for a preliminary preheating before actual cutting is commenced.

In present-day steel-making methods, such as continuous casting, slabs of great width and thickness are produced. It is necessary to crop the head and tail of such slabs as by a cross-cut saw to provide square-cut ends for subsequent rolling. It is desirable to use a gang torch for cutting the crops into a size suitable for charging into steel-making vessels. Cutting torches, however, require that the edge of the crop be preheated before a cut is actually started. This presents a problem in positioning several torches at the proper distance from the advancing edge of the crop to insure the desired preheating of the regions where kerfs are to be initiated, because the leading edge of the crop may be angular or irregular.

BRIEF SUMMARY OF THE INVENTION

We have invented apparatus for solving the aforementioned problem. Our apparatus comprises a gantry extending across the crop conveyor and having a plurality of tubes slidable therein in the line of travel of the crop. Springs urge the tubes forwardly and each tube supports a torch and a depending strut on which a flag is pivoted adapted to be engaged by the leading edge of the crop. A normally rigid linkage controls the position of each flag. When the flag is engaged by the crop, the advance thereof pushes the flag and tube back. When all the flags have been engaged, all the tubes are clamped and the torches are operated to discharge preheating flames and lift cylinders, one for each flag, are operated to raise the flags above the path of the crop. When sufficient preheating has been effected, the torches are operated to produce cutting flames.

A complete understanding of the invention may be obtained from the following detailed description and explanation which refer to the accompanying drawings illustrating the present preferred embodiment. In the drawings:

BRIEF DESCRIPTION OF THE DRAWINGS

FIGURE 1 is a plan view of the crop conveyor having our invention incorporated therewith;
FIGURE 2 is a side elevation;
FIGURE 3 is an enlarged section through one of the torch-supporting tubes and associated parts, showing other parts in elevation; and
FIGURE 4 is an enlarged front elevation of a torch-supporting strut.

DETAILED DESCRIPTION OF THE PREFERRED EMBODIMENT

Referring now in detail to the drawings, a crop conveyor 10 of any suitable construction is conveniently disposed at right angles to the slab-production line so as to receive crops cut from the head and tail of each slab. Conveyor 10 has side guides 10a. A crop 11 is carried on conveyor 10 toward a gang cutting-torch assembly indicated generally at 12. Assembly 12 comprises a gantry 13 extending cross conveyor 10, including A-frames 14 and a beam 15. Slide bearings 16 are spaced along the length of beam 15, extending therethrough, parallel to the direction of travel of conveyor 10. A torch-supporting tube 17 is slidable in each bearing 16 and is urged toward its extreme forward position by a compression spring 18. The tube is splined to the bearing so it cannot rotate. The top surface of the tube is flattened and serrated as at 19 for a purpose shortly to appear.

At its forward end, each tube 17 has a box-section head 20. A strut 21 depends from each head. A bracket 22 (FIGURE 4) attached to each strut supports a torch 23 and a spacing bar 24 having a crop-contacting roller 25. The torch and bar are slidable vertically in bracket 22 and are secured together by a clamp arm 26. Strut 21 has a flag 27 pivoted to the lower end thereof adapted to be engaged by the leading edge of advancing crop 11. Flag 27 is of bell-crank shape and has a link 28 pivoted thereto and to the piston rod 29 of a cylinder 30 upstanding on head 20.

Pairs of spaced cantilever arms 31 mounted on beam 15 support bridge plates 32 extending therebetween. A fluid-pressure cylinder and piston 33 on each plate 32 actuates a pair of levers 34 pivoted to beam 15 at 35, through a box-section tie 36 connecting them. Levers 34 are in vertical alinement with tubes 17 and have brake shoes 37 adapted to engage the flattened, serrated upper surfaces of the tubes when the levers are tilted counterclockwise by cylinder and piston 33. This holds the tubes against axial shifting.

In the operation of our apparatus, cylinders 30 are energized to hold their pistons in their lowermost positions and cylinders 33 are caused to raise their pistons. Springs 18, of course, hold tubes 17 in their forwardmost position. As a crop advances along conveyor 10 its leading edge may be angular and irregular. In any event, the flags 27 of the several torches will be engaged in a certain order depending on the shape and disposition of the crop edge. As each flag is engaged, its tube 17 will be pushed back. When all the tubes have been displaced a minimum distance, cylinders 33 will be operated to cause their positions to descend. This causes the tubes to be clamped by shoes 37. The operation described may be effected by limit switches connected in series, one for each tube, adapted to close as soon as each tube moves rearwardly from its normal position. Cylinders 30 are also caused to raise their pistons thus tilting flags 27 out of the way of further advance of the crop. Similarly, the drive for conveyor 10 is stopped. The torches 23 are thus accurately positioned to preheat the traces of kerfs to be subsequently cut through the crop, and an operator may cause the proper preheating flame to be discharged by opening the proper fuel valve whereupon the fuel is ignited by constantly burning pilot lights.

After preheating, the supply of fuel is changed to cause the torches to discharge cutting jets and conveyor 10 is restarted. As a result, the crop is severed along lines through the several torches into pieces suitable for charging as scrap.

It will be apparent that our apparatus effectively positions the torches properly relative to a crop for preheating it preparatory to cutting.

Although we have disclosed herein the preferred practice of our invention, we intend to cover as well any change or modification therein which may be made without departing from the spirit and scope of the invention as set forth in the claims.

What is claimed is:

1. Crop-cutting apparatus comprising a gantry extending over a crop conveyor, a plurality of yieldable torch mounts spaced along said gantry, a torch depending from each mount, an abutment pivotally carried by each mount adjacent each torch adapted to be engaged by the leading edge of a crop on the conveyor, means for selectively preventing tilting of the abutment or effecting tilting thereof to a position out of the way of a crop, and brake means for locking said mounts in yielded positions.

2. The combination defined by claim 1 characterized by each mount including a slide bearing on said gantry, and a member reciprocable therein, said torch and said abutment being mounted on said member.

3. The combination defined by claim 2 characterized by said member being a tube slidable through said bearing.

4. The combination defined by claim 1 characterized by said brake means including brake shoes pivoted to the gantry adapted to engage each mount to prevent yielding thereof.

5. The combination defined by claim 4 characterized by cantilever arms extending from said gantry and fluid-pressure cylinders and pistons mounted thereon adapted to actuate said brake shoes.

6. The combination defined by claim 1 characterized by said abutment being a member of bell-crank shape and said means preventing tilting thereof being a suspended linkage normally hanging straight.

7. The combination defined by claim 6 characterized by said means effecting tilting being a fluid-pressure cylinder adapted to pull up on said linkage.

8. Gang torch-cutting apparatus comprising a beam extending across a conveyor for the material to be cut, sleeve bearings spaced along said beam, a tube reciprocable in each bearing a torch and abutment carried at the forward end of each tube, a strut depending from each tube on which the abutment is pivoted, a cylinder and piston on each tube for selectively holding said abutment against tilting or effecting tilting thereof to an out of the way position, and brake means mounted on said beam engageable with each tube for fixing the position thereof.

9. The combination defined by claim 8 characterized by power means for actuating said brake means.

10. The combination defined by claim 9 characterized by said brake means including a lever pivoted to said beam and a shoe adapted to engage said tube.

References Cited

UNITED STATES PATENTS

| | | | |
|---|---|---|---|
| 2,494,994 | 1/1950 | Gamallo | 266—23 |
| 3,339,903 | 9/1967 | Reinfeld et al. | 266—23 |

J. SPENCER OVERHOLSER, Primary Examiner

ROBERT D. BALDWIN, Assistant Examiner